United States Patent
Kim et al.

(10) Patent No.: US 7,177,415 B1
(45) Date of Patent: Feb. 13, 2007

(54) TELEPHONE NUMBER SEARCHING SYSTEM SUPPORTING AUTOMATIC TELEPHONE CONNECTION AND METHOD THEREFOR

(75) Inventors: Ki-young Kim, Sungnam (KR); Min-seop Lee, Seoul (KR); Hwa-kyung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/179,405

(22) Filed: Oct. 27, 1998

(30) Foreign Application Priority Data

Oct. 28, 1997 (KR) ............................... 1997-55564

(51) Int. Cl.
*H04M 3/42* (2006.01)
*H04M 3/00* (2006.01)

(52) U.S. Cl. ............................. 379/216.01; 379/355.1
(58) Field of Classification Search ................ 379/216, 379/355, 356, 93.09
See application file for complete search history.

(56) References Cited

U.S. PATENT DOCUMENTS

| | | | | |
|---|---|---|---|---|
| 5,764,736 A * | 6/1998 | Shachar et al. | .......... | 379/93.09 |
| 5,884,032 A * | 3/1999 | Bateman et al. | ............ | 379/216 |
| 5,982,774 A * | 11/1999 | Foladare et al. | ............ | 379/216 |
| 6,091,808 A * | 7/2000 | Wood et al. | ................ | 379/216 |
| 6,178,183 B1 * | 1/2001 | Buskirk, Jr. | ................ | 379/202 |
| 6,192,044 B1 * | 2/2001 | Mack | ......................... | 379/202 |
| 6,870,828 B1 * | 3/2005 | Giordano, III | .............. | 370/352 |

FOREIGN PATENT DOCUMENTS

| | | |
|---|---|---|
| JP | 64-58159 | 3/1989 |
| JP | 7-297924 | 11/1995 |
| JP | 7297924 | 11/1995 |
| JP | 9-81447 | 3/1997 |
| JP | 9081447 | 3/1997 |
| JP | 9-231263 | 9/1997 |
| JP | 10-98467 | 4/1998 |
| JP | 10-164256 | 6/1998 |
| JP | 10-336346 | 12/1998 |
| JP | 10-336349 | 12/1998 |
| JP | 11-122589 | 4/1999 |

OTHER PUBLICATIONS

NTT Technology Journal, May 1, 1997, vol. 9, No. 5, pp. 72-76.
NTT Technical Journal, NTT Telecommunications Magazine, May 1997, vol. 9, No. 5, pp. 72-76.

* cited by examiner

*Primary Examiner*—William J. Deane, Jr.
(74) *Attorney, Agent, or Firm*—Staas & Halsey LLP

(57) ABSTRACT

A telephone number searching system supporting an automatic telephone connection in which a telephone number is searched for through the internet and automatically dialed, and a method therefor. A web server is connected to a telephone number database for storing multiple predetermined telephone numbers. An information terminal is equipped with a web browser which is selectively connected to the web server for submitting a search request to receive a telephone number service and searching a telephone number from the telephone number database to display at least one searched telephone number. One number is selected by a user among the displayed telephone numbers and dialed automatically by a telephone plug-in to set up a communication channel through the telephone.

4 Claims, 4 Drawing Sheets

FIG. 4

NAME/COMPANY NAME: JOHN DOE

ADDRESS: WASHINGTON DC

KEY WORD: [ ]   SEARCH

FIG. 5

JOHN DOE : 1615 NEW HAMPSHIRE AVE., NW WASHINGTON DC
   TELEPHONE NUMBER<DIALTO>555-5151</DIALTO>

JOHN DOE : 1233 20TH ST., NW WASHINGTON DC
   TELEPHONE NUMBER<DIALTO>555-5124</DIALTO>

JOHN DOE : 1616 P ST., NW WASHINGTON DC
   TELEPHONE NUMBER<DIALTO>555-2471</DIALTO>

FIG. 6

JOHN DOE : 1615 NEW HAMPSHIRE AVE., NW WASHINGTON DC
   TELEPHONE NUMBER 555-5151

JOHN DOE : 1233 20TH ST., NW WASHINGTON DC
   TELEPHONE NUMBER 555-5124

JOHN DOE : 1616 P ST., NW WASHINGTON DC
   TELEPHONE NUMBER 555-2471

TELEPHONE NUMBER SEARCHING SYSTEM SUPPORTING AUTOMATIC TELEPHONE CONNECTION AND METHOD THEREFOR

CROSS-REFERENCE TO RELATED APPLICATIONS

This application claims the benefit of Korean Application No. 97-55564, filed Oct. 28, 1997, in the Korean Patent Office, the disclosure of which is incorporated herein by reference.

BACKGROUND OF THE INVENTION

1. Field of the Invention

The present invention relates to an internet service providing system and a method therefor, and more particularly, to a telephone number searching system using an internet and a method therefor.

2. Description of the Related Art

With increasing use of the internet, various services are being offered on the internet. Telephone directories are also being provided through internet information services. It is economical to use this service since people can obtain desired telephone number information without referring to a telephone number directory book or calling a telephone number inquiry center. Also, it is convenient since various kinds of additional information which are not provided by the telephone number directory service can be obtained.

FIG. 1 is a flowchart showing a conventional telephone number searching method through the internet.

When a user wishes to know the telephone number of a specific person or company, the user connects to a web server which provides a telephone number service using a web browser (step 100). When the web browser is connected to the web server, the user inputs the name of the person or company (step 110). When the name of the person or company to be searched is input, the search engine searches concerned information from a telephone directory database and transfers searched information to the web browser in a hypertext markup language (HTML) document format (steps 120 and 130). When there are a plurality of searched results in the transferred information, the user searches the specifically desired information by using additional information such as a detailed address, an E-mail address, and so on (step 140). After searching the desired information, the user terminates the internet connection and makes a phone call using the searched telephone number information (step 150).

When the telephone number service is provided on a conventional web server, the user must terminate the Internet connection and directly dial the number obtained through the search to make a phone call. However, if the obtained number is erroneous and the user wishes to search for another number, the user must connect again to the internet.

SUMMARY OF THE INVENTION

To solve the above problem, an object of the present invention is to provide a telephone number searching system supporting an automatic telephone connection in which a telephone number is searched through the internet and automatically dialed.

Another object of the present invention is to provide a telephone number searching method for searching for a telephone number and then automatically dialing the searched for number through the internet.

Additional objects and advantages of the invention will be set forth in part in the description which follows and, in part, will be obvious from the description, or may be learned by practice of the invention.

In the telephone number searching system to achieve the above and other objects of the present invention, a web server is connected to a telephone number database for storing multiple predetermined telephone numbers. An information terminal is equipped with a web browser which is selectively connected to the web server for submitting a search request to receive a telephone number service and searching for a telephone number from the telephone number database to display at least one searched for telephone number. One number is selected by a user among the displayed telephone numbers and dialed automatically by a telephone plug-in to set up a communication channel through the telephone.

The above and other objects of the present invention are achieved by providing a telephone number searching method supporting automatic dialing, including the steps of: (a) connecting a web browser to a telephone web server; (b) inputting a search word to be searched to the web server; (c) displaying a result searched by the web server; and (d) selecting one telephone number from the result displayed in said step (c) and operating a telephone plug-in to dial the selected telephone number automatically.

BRIEF DESCRIPTION OF THE DRAWINGS

The above and other objects and advantages of the present invention will become more apparent by describing in detail a preferred embodiment thereof with reference to the attached drawings in which:

FIG. 4 shows an example of a screen for inputting a search context in the web server home page of FIG. 2;

FIG. 5 shows an example of an HTML document transferred by the web server in the system shown in FIG. 2; and FIG. 6 shows an example of a screen displayed on a user's web browser in the system shown in FIG. 2, in which the searched telephone number is displayed.

DESCRIPTION OF THE PREFERRED EMBODIMENT

Figure 1:
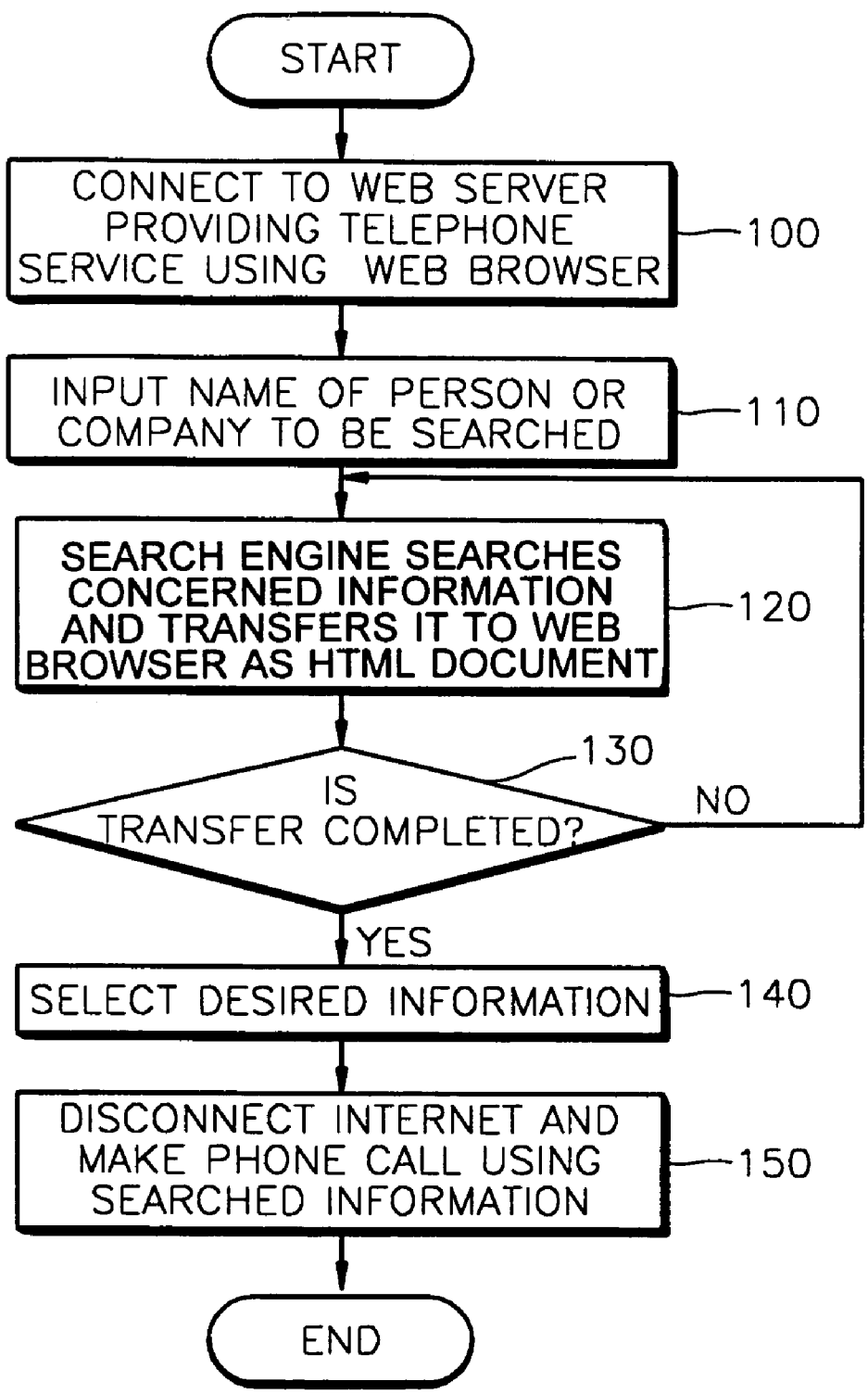
FIG. 1 is a flowchart showing a conventional telephone number searching method through the internet.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
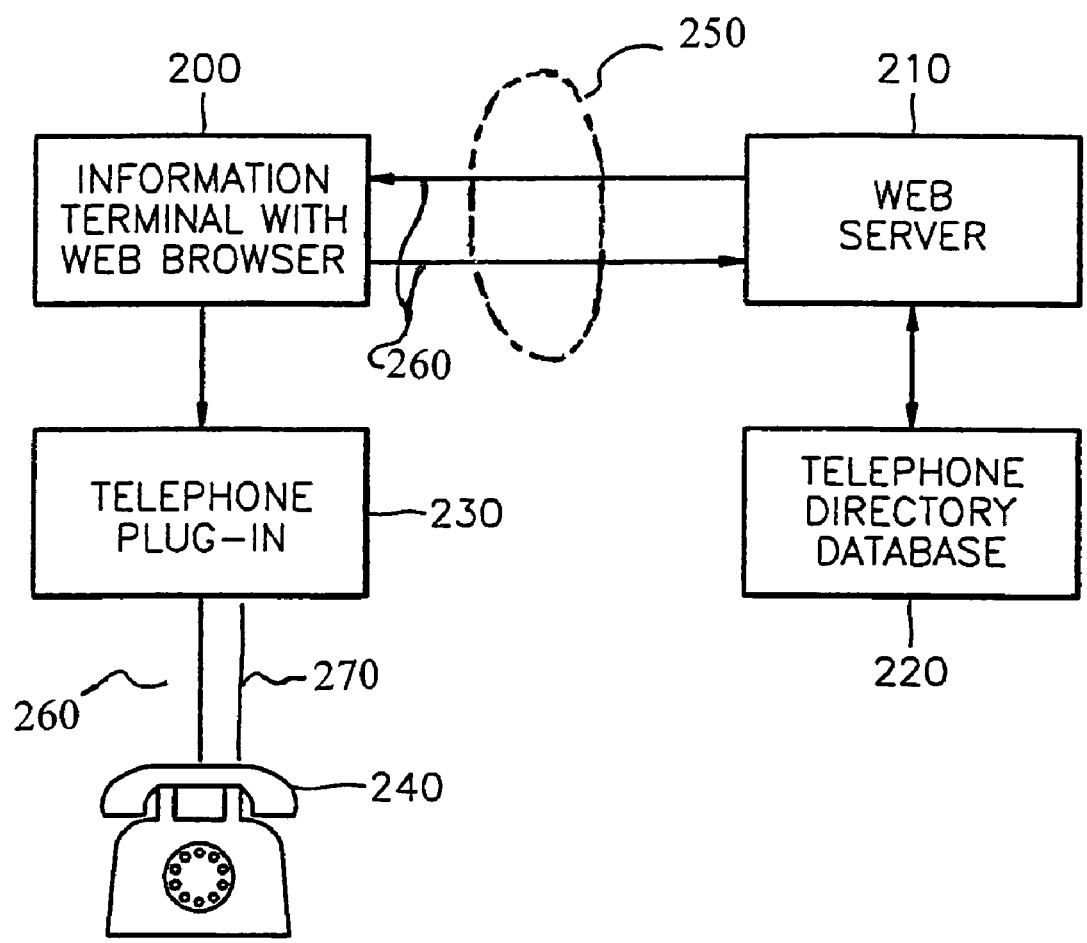
FIG. 2 is a block diagram showing the structure of a telephone number searching system supporting an automatic telephone connection according to an embodiment of the present invention.

FIG. 2 shows a telephone number searching system which includes a user's information terminal equipped with a web browser 200 (hereinafter, referred to simply as a web browser), a web server 210, a telephone directory database 220 in which predetermined telephone numbers are stored, a telephone plug-in 230 for connecting a telephone to the telephone number searched for in the telephone book database 220, and a telephone 240 connected to the telephone plug-in 230, according to an embodiment of the present invention.

Figure 3:
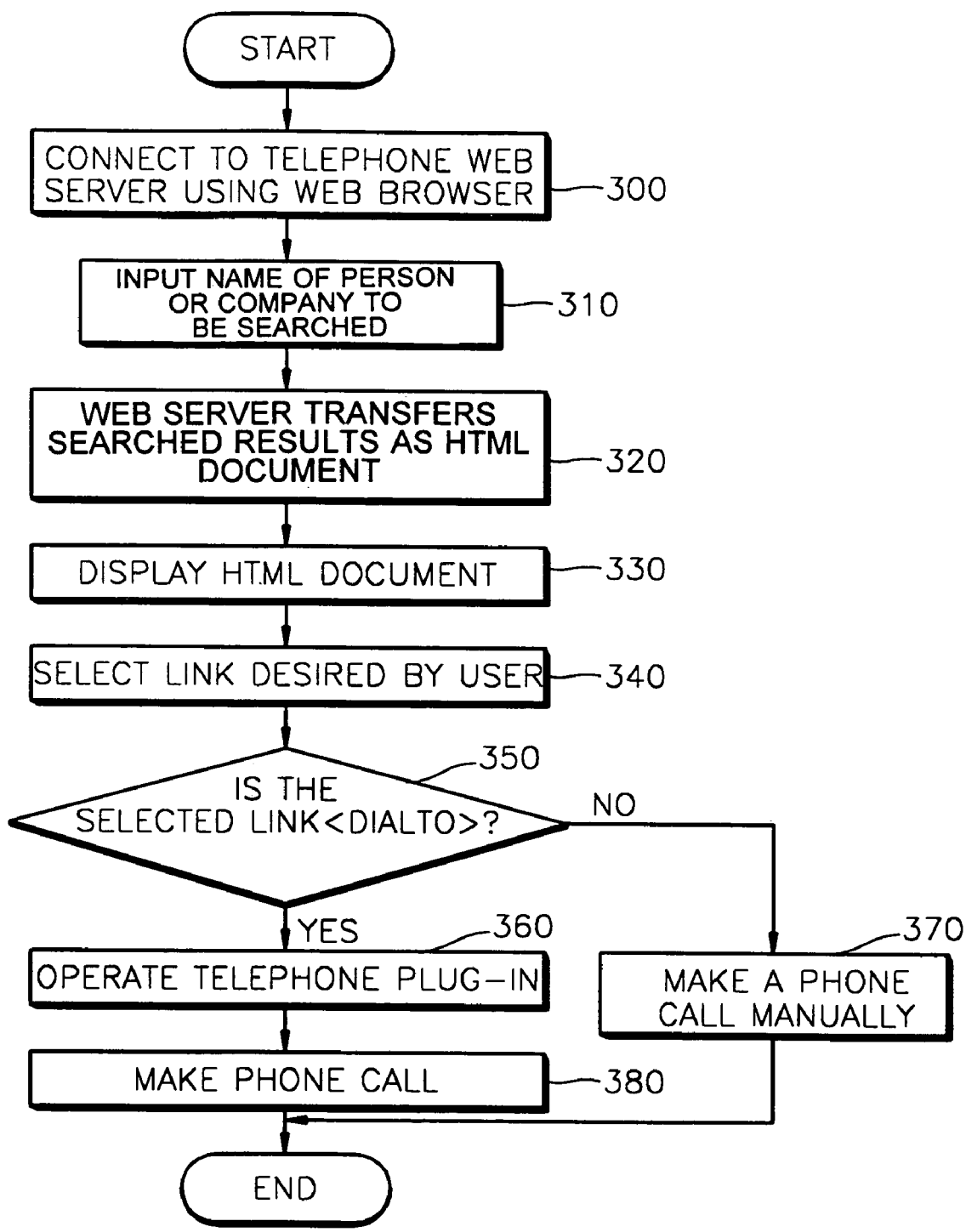
FIG. 3 is a flowchart describing a telephone searching method according to the embodiment of the present invention.

FIG. 3 is a flowchart describing a telephone number searching method according to the embodiment of the present invention which supports an automatic telephone connection.

The flowchart shown in FIG. 3 includes the steps of connecting to the telephone web server using the web browser (step 300), inputting the name of a person or company to be searched in the home page of the web server (step 310), searching for the name of the person or company input to the web server from the telephone directory database and transferring the results of the search as an HTML document (step 320), displaying the HTML document (step 330), selecting a link the user desires from the displayed HTML document (step 340), determining whether the link selected by the user is described by "dialto" (step 350), operating a telephone plug-in if the link selected by the user is "dialto" (step 360), making a telephone call manually if the link selected by the user is not "dialto" (step 370), and automatically making a phone call (step 380) if the telephone plug-in is operated in step 360.

FIG. 4 shows an example of a screen for inputting a search request in the web server home page of FIG. 2, FIG. 5 shows an example of an HTML document transferred by the web server in the system shown in FIG. 2, and FIG. 6 shows an example of a screen displayed on a user's web browser, in which the searched for telephone number is displayed, in the system shown in FIG. 2.

The present invention will be described in detail with reference to FIGS. 2 through 6.

When a user wishes to make a phone call upon searching the telephone number of a counterpart, the user browses the web server 210 through the internet 250 using the web browser 200 (step 300). When the connection to the telephone web server 210 is completed by the web browser 200, a search screen of the telephone number web server 210 is displayed on the web browser 200. FIG. 4 shows an example of a search screen provided by the web server 210 so that the user inputs the proper search requests. In the present embodiment, the search screen includes two windows for inputting the name of a person or company and an address, and an additional window for inputting a keyword such as an E-mail address optionally.

The user inputs the name of the person or company to be searched for in the telephone directory database 220 and the address or the keyword thereof, and clicks a search button (step 310). The example of FIG. 4 shows that the name and the address are input to search for the telephone number of John Doe, living in Washington, D.C.

When the information to be searched for is input to the home page of the web server 210 and the search button is clicked, the web server 210 searches for the telephone numbers stored in the telephone number database 220 of all the John Does living in Washington, D.C., and transfers the searched results as an HTML document (step 320). FIG. 5 shows an example of the HTML document transferred by the web server 210 as a result of the search.

The transferred HTML document is displayed on the screen of the user (step 330). FIG. 6 shows an example of a screen displayed on the user's web browser 200. Here, the telephone numbers of all the people having the name "John Doe" and living in Washington, D.C. are displayed on the screen.

After checking the searched results, the user selects a desired link from the screen (step 340). For example, the user may select the telephone number 555-5124 of John Doe living at 1233 20th St., N.W., Washington, D.C., which is the second of the three links displayed on the screen.

In step 350, the web browser 200 determines whether the link selected by the user is expressed by <dialto>. Here, <dialto> is a tag defined by the writer of the HTML document. That is, in the present invention, the link syntax for executing an automatic dialing is described by "<dialto> telephone number </dialto>." When a link described in such a syntax is selected by the user, the telephone plug-in 230 operates and dials a corresponding phone number automatically (step 360). Here, the telephone plug-in 230 is an apparatus or software for automatically connecting a telephone according to the searched for telephone number. In other words, an automatic dialing operation carries out a program, i.e., a dialing routine, which receives the telephone number from the web browser 200 and automatically dials the number.

The telephone plug-in 230 connects to the telephone 240 with the selected telephone number using the same telephone line 260 (first telephone line) as that used to connect the information terminal with web browser 200 to the web server 210. That is, the information terminal with web browser 200 is not connected to the web server 210 while the telephone plug-in 230 is in use. Thus, the internet connection between the information terminal with the web browser 200 and the web server 210 is disconnected while the telephone plug-in 230 operates and dials a corresponding telephone number automatically and connects the telephone with the selected telephone number (step 380).

If the selected telephone number is not the desired telephone number, the information terminal with web browser 200 automatically reestablishes the connection with the web server 210 so that the user may select another one of the telephone numbers which was retrieved as a result of the search.

However, if a second separate telephone line 270 is available, the telephone plug-in 230 may be operated using the second telephone line 270 while the information terminal with web browser 200 is connected to the web server 210 using the first telephone line 260. As a result, the use of a second telephone line 270 is optional according to the present invention.

It can be seen that the telephone numbers shown in FIG. 5 are all defined by the automatic dialing syntax. Therefore, all the telephone numbers can be dialed automatically. Since the user selected the second link, which is defined as "<dialto>555-5124</dialto>, the number 5555124 is dialed automatically. After the number is automatically dialed, the call channel is set up (step 380).

On the other hand, when the link selected by the user is not defined by <dialto> in step 350, the user has to make a phone call manually (step 370). Thus, the user searches the desired number among the telephone numbers displayed on the screen shown in FIG. 6, and makes a phone call by directly dialing the number.

The user may disconnect from the internet and make a telephone call manually and his telephone call can be made on the same telephone line as that used to connect to the internet.

As mentioned above, since the telephone number searched for by the user with the internet is automatically dialed and is connected to the telephone according to the present invention, the present invention provides convenience to the user.

In the embodiment of the present invention described above, the user's equipment, including the web browser 200, the telephone plug-in 230 and the telephone 240, may be implemented by a personal computer and a general purpose telephone. However, in an alternative embodiment of the present invention, the user's equipment may be implemented by a web phone or a hand-held phone which supports a web browser.

Although the present invention has been described in detail above, it should be understood that the foregoing description is illustrative and not restrictive. Those of ordinary skill in the art will appreciate that many obvious modifications can be made to the invention without departing from its spirit or essential characteristics. Accordingly, the scope of the invention should be interpreted in the light of the following appended claims.

What is claimed is:

1. A system for dialing a telephone number retrieved via a first telephone line and the internet from a remote web server which stores multiple telephone numbers in a telephone number database, the system comprising:
   a telephone operable by a user and connected with a second telephone line; and
   an information terminal operable by the user and comprising:
      a web browser, which selectively connects to the web server via the first telephone line and the internet, and which submits a search request to the remote web server for searching the stored telephone numbers in the telephone number database, and the remote web server transfers at least one telephone number among the stored telephone numbers to the web browser;
      a screen which:
         displays the search request input by a user, and
         displays the at least one telephone number retrieved by the web server as a hypertext markup language (HTML) document; and
      a telephone plug-in connected with the web browser, the second telephone line, and the telephone, wherein:
         where the user selects one of the retrieved and displayed telephone numbers, the web browser determines whether the selected telephone number is defined with a predetermined link syntax, and if the selected telephone number is defined with the predetermined link syntax, the telephone plug-in automatically dials the selected telephone number using the second telephone line independently of the web server, to set up a communication channel through the telephone, the communication channel being independent of the telephone plug-in, the first telephone line and the internet.

2. The system of claim 1, wherein the web browser, the telephone plug-in and the telephone are implemented by one of:
   a personal computer;
   a general purpose telephone;
   a web phone; or
   a hand-held phone that supports a web browser.

3. A system for dialing a telephone number retrieved via a telephone line and the internet from a remote web server which stores multiple telephone numbers in a telephone number database, the system comprising:
   a telephone operable by a user and connected with the telephone line; and
   an information terminal operable by the user and comprising:
      a web browser, which selectively connects to the web server via the telephone line and the internet, to submit a search request to the web server for searching the stored telephone numbers in the telephone number database, to obtain at least one telephone number among the stored telephone numbers;
      a screen which:
         displays the search request input by a user, and
         displays the at least one telephone number retrieved by the web server as a hypertext markup language (HTML) document; and
      a telephone plug-in connected with the web browser, the telephone line and the telephone, wherein:
         where the user selects one of the retrieved and displayed telephone numbers, the information terminal automatically disconnects the web browser from the telephone line, the web server and the internet and if the web browser determines that the selected telephone number is defined with a predetermined link syntax, the telephone plug-in automatically dials the selected telephone number independently of the web server, to set up a communication channel through the telephone, the communication channel being independent of the telephone plug-in, the web server, and the internet, and
         if the web browser determines that the selected telephone number is not defined by the predetermined link syntax, the user is enabled to dial the selected telephone number manually using the telephone line.

4. The system of claim 3, wherein the web browser, the telephone plug-in and the telephone are implemented by one of:
   a personal computer;
   a general purpose telephone;
   a web phone; or
   a hand-held phone that supports a web browser.

* * * * *